(12) United States Patent
Jen et al.

(10) Patent No.: US 9,403,157 B2
(45) Date of Patent: Aug. 2, 2016

(54) THREE-WAY CATALYST COMPRISING MIXTURE OF NICKEL AND COPPER (71) Applicant: Ford Global Technologies, LLC, Dearborn, MI (US)

(72) Inventors: Hungwen Jen, Troy, MI (US); Eva Thanasiu, Trenton, MI (US); Jeffrey Scott Hepburn, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 434 days.

(21) Appl. No.: 13/872,621

(22) Filed: Apr. 29, 2013

(65) Prior Publication Data

US 2014/0322114 A1    Oct. 30, 2014

(51) Int. Cl.
*B01J 23/00* (2006.01)
*B01J 29/76* (2006.01)
(Continued)

(52) U.S. Cl.
CPC .............. *B01J 29/76* (2013.01); *B01D 53/945* (2013.01); *B01J 23/755* (2013.01); *B01J 23/894* (2013.01); *B01J 23/8946* (2013.01); *B01D 53/9477* (2013.01); *B01D 2255/20753* (2013.01); *B01D 2255/20761* (2013.01); *B01D 2255/908* (2013.01); *B01D 2255/9022* (2013.01); *B01J 23/78* (2013.01); *B01J 23/83* (2013.01); *B01J 35/0006* (2013.01); *B01J 37/0244* (2013.01); *Y02T 10/22* (2013.01)

(58) Field of Classification Search
CPC ... B01J 23/888; B01J 23/8872; B01J 23/8878
USPC ............... 502/325, 327, 349, 340; 423/213.2
See application file for complete search history.

(56) References Cited

U.S. PATENT DOCUMENTS 3,098,829 A    7/1963  White et al.
3,953,363 A *  4/1976  Yamauchi ............ B01D 53/945
                                                  423/213.5
(Continued)

FOREIGN PATENT DOCUMENTS

JP          1339144 A      5/1989
WO       2007064808 A1    6/2007
WO       2008132452 A2   11/2008

OTHER PUBLICATIONS

Villegas et al., "Wet imprenation of alumina-washcoated monoliths: Effect of the drying procedure on Ni distribution and on autothermal reforming activity", Applied Catalysis A: General, vol. 320, pp. 43-55, Mar. 22, 2007.

(Continued)

*Primary Examiner* — Colleen Dunn
*Assistant Examiner* — Haytham Soliman
(74) *Attorney, Agent, or Firm* — Damian Porcari; Alleman Hall McCoy Russell & Tuttle LLP (57) ABSTRACT

A three-way catalyst including a mixture of nickel and copper is provided for reducing carbon monoxide, hydrocarbon emissions, and nitrogen oxides from vehicle engine exhausts. The catalyst is impregnated onto a carrier substrate which is non-reactive with nickel and copper. When used in a vehicle exhaust gas treatment system, the nickel-copper catalyst provides improved efficiency in reducing CO, HC, and $NO_x$ emissions over the use of conventional three-way-catalysts and provides enhanced oxygen storage capacity (OSC) and water-gas-shift (WGS) functions.

17 Claims, 9 Drawing Sheets

(51) Int. Cl.
*B01D 53/94* (2006.01)
*B01J 23/755* (2006.01)
*B01J 23/89* (2006.01)
*B01J 37/02* (2006.01)
*B01J 35/00* (2006.01)
*B01J 23/78* (2006.01)
*B01J 23/83* (2006.01)

(56) References Cited

U.S. PATENT DOCUMENTS

| | | | |
|---|---|---|---|
| 3,985,683 | A | 10/1976 | Stenzel |
| 4,006,103 | A | 2/1977 | Meguerian et al. |
| 4,012,485 | A | 3/1977 | Meguerian et al. |
| 4,111,849 | A | 9/1978 | Fedor |
| 4,654,319 | A | 3/1987 | Kim et al. |
| 5,182,249 | A | 1/1993 | Wang et al. |
| 5,534,475 | A | 7/1996 | Miramontes Cardenas et al. |
| 5,688,740 | A | 11/1997 | Bolshakov et al. |
| 5,795,553 | A | 8/1998 | Lott et al. |
| 6,074,973 | A | 6/2000 | Lampert et al. |
| 6,143,261 | A | 11/2000 | Lissy et al. |
| 6,167,696 | B1 | 1/2001 | Maasiedvaag et al. |
| 6,231,817 | B1 | 5/2001 | Shimoda et al. |
| 6,779,338 | B1 | 8/2004 | Lewis |
| 6,841,512 | B1 | 1/2005 | Fetcenko et al. |
| 6,887,438 | B2 | 5/2005 | Labarge et al. |
| 7,678,734 | B2 | 3/2010 | Chigapov et al. |
| 7,758,834 | B2 | 7/2010 | Chen et al. |
| 7,913,672 | B2 | 3/2011 | Elwart et al. |
| 8,112,985 | B2 | 2/2012 | Uhrich et al. |
| 8,161,733 | B2 | 4/2012 | Uhrich et al. |
| 2006/0216227 | A1 | 9/2006 | Idem et al. |
| 2007/0166826 | A1 | 7/2007 | Stockwell |
| 2009/0304566 | A1 | 12/2009 | Golden et al. |
| 2009/0324468 | A1* | 12/2009 | Golden ............. B01D 53/945 423/210 |
| 2010/0293929 | A1* | 11/2010 | Zhan ............. F01N 3/035 60/297 |
| 2011/0056269 | A1 | 3/2011 | Odendall et al. |
| 2011/0061371 | A1 | 3/2011 | Cavataio et al. |
| 2011/0072801 | A1 | 3/2011 | Lupescu et al. |

OTHER PUBLICATIONS

El-Shobaky et al., "Nickel cuprate supported on cordierite as an active catalyst for CO oxidation by O2", Applied Catalysis B: Environmental, vol. 63, Issues 3-4, pp. 168-177, Mar. 31, 2006.

Loof et al., "Oxygen storage capacity of noble metal car exhaust catalysts containing nickle and cerium", Journal of Catalysis, vol. 118, Issue 2, pp. 339-348, Aug. 1989.

Lin et al., "Supported Copper, Nickel and Copper-Nickel Nanoparticle Catalysts for Low Temperature Water-Gas-Shift Reaction", OhioLink EDT Center, http://etd.ohiolink.edu/view.cgi?acc_num=ucin1327068565.

Dastanian et al., "Desulfurization of Gasoline over Nanoporous Nickel-Loaded Y-Type Zeolite at Ambient Conditions", American Chemical Society, Ind. Eng. Chem. Res., 49, pp. 11254-11259, 2010.

Muench et al., "Extruded Zeolite Based Honeycomb Catalyst for NOx Removal from Diesel Exhaust", SAE Technical Paper Series, 2008-01-1024, Apr. 14-17, 2008.

Marino et al., "Hydrogen production from steam reforming of bioethanol using Cu/Ni/K/y—A1203 catalysts. Effects of Ni", International Journal of Hydrogen Energy 26, pp.

Kwak et al., "Hydrogen-rich gas production from ethanol steam reforming over Ni/Ga/Mg/Zeolite Y catalysts at mild temperature", Applied Energy, 88, pp. 4366-4375, 2011.

2013 Phd Degree Program, "Preparation and Property Research of the Copper-Based Three-Way Catalyst Doped with Nickel", Research-Degree.com, http://www.12340000.com/science-engineering-b/chemistry/1468.html.

* cited by examiner

THREE-WAY CATALYST COMPRISING MIXTURE OF NICKEL AND COPPER

BACKGROUND OF THE INVENTION

Embodiments described herein relate to the use of three-way catalysts in reducing carbon monoxide, nitrogen oxides ($NO_x$), and hydrocarbon emissions from vehicle exhausts, and more particularly, to a three-way catalyst comprising a mixture of nickel and copper.

In recent years, government regulations in the United States have restricted emissions of carbon monoxide (CO), hydrocarbons (HC) and nitrogen oxides ($NO_x$) from vehicle engine exhausts. This has necessitated the use of catalysts in gasoline and diesel powered vehicles which function to stimulate the oxidation reaction of HC and CO and the reduction of $NO_x$. Such catalysts are typically referred to as three-way conversion (TWC) catalysts because they simultaneously oxidize CO and HC to $CO_2$ and water while reducing $NO_x$ to nitrogen. Three-way conversion catalysts often include materials with oxygen storage capacity (OSC), i.e., materials which provide additional oxygen needed to oxidize carbon monoxide and hydrocarbons in the exhaust at rich air/fuel ratios. During subsequent lean air/fuel operations, the excess oxygen in the exhaust then replenishes the depleted oxygen of the OSC materials used in the previous rich operations, which enhances the overall reduction of $NO_x$ in the exhaust stream. Such OSC materials typically comprise cerium-based oxides such as cerium oxide ($CeO_2$), cerium-zirconium mixed oxides ($Ce_xZr_yO_2$), and cerium-praseodymium mixed oxides ($Ce_xPr_yO_2$).

However, in some vehicle operations with long and rich air/fuel excursions, conventional cerium-based oxides do not generate sufficient amounts of oxygen needed for the oxidation of HC and CO. In commonly-assigned application Ser. No. 13/367,692, a nickel-based catalyst is described which provides additional OSC function as well as water-gas-shift activity to a conventional three-way catalyst aftertreatment system.

However, it would be desirable to provide enhanced OSC and WGS functions to improve the reduction of emissions of carbon monoxide, hydrocarbons, and nitrogen oxides.

Accordingly, there is a need in the art for a three-way catalyst which provides reduction of carbon monoxide, nitrogen oxides, and hydrocarbon emissions from vehicle exhausts, and to a catalyst having enhanced oxygen storage capacity and enhanced reduction of carbon monoxide or hydrocarbons via a catalyst water-gas-shift reaction.

SUMMARY OF THE INVENTION

Embodiments of the invention meet those needs by providing a three-way catalyst for use in a vehicle exhaust which is comprised of a mixture of nickel and copper (also referred to herein as a nickel-copper catalyst). When placed in a vehicle exhaust, the catalyst is capable of providing supplemental oxygen storage capacity for the oxidation of carbon monoxide and hydrocarbons during lean-to-rich transitions as well as the reduction of nitrogen oxides during rich-to-lean transitions. The three-way catalyst also provides removal of carbon monoxide and hydrocarbons via catalytic water-gas-shift (WGS) and steam-reforming operations after the depletion of oxygen storage capacity.

According to one aspect of the invention, a three-way catalyst for use in a vehicle exhaust is provided which comprises a catalyst comprising a mixture of nickel and copper on a carrier, where the carrier is non-reactive to nickel and copper. By "non-reactive to nickel and copper," it is meant that the carrier contains no materials such as alumina or magnesium aluminate which could adversely react with copper or nickel and reduce the catalyst function or cause deactivation of the catalyst.

The carrier preferably comprises a material selected from the group consisting of zirconium oxide, cordierite, silicon carbide, silica gel, and non-reactive alumina. By "non-reactive alumina," it is meant a type of alumina such as delta alumina which will not react with nickel or copper to reduce their respective functions. The carrier may be in the form of a honeycomb substrate or in the form of a powder. Where the carrier is in the form of a honeycomb substrate, the nickel and copper mixture may be loaded directly onto the honeycomb substrate. In embodiments where the carrier is in the form of a powder, nickel and copper loaded carrier powders can be washcoated directly onto a carrier such as a honeycomb substrate.

The nickel-copper catalyst is contained on the carrier at a loading of between about 2 to about 20 wt %, and preferably, at a loading of between about 8 to about 15 wt %. The nickel component of the catalyst mixture is preferably contained on the carrier at a loading between about 4 to about 20 wt %, and the copper component of the catalyst mixture is preferably contained on the carrier at a loading between about 0.4 to about 10 wt %. Loading is typically calculated as a percentage of the increase in weight of the carrier before and after application of the catalyst.

The weight ratio of nickel to copper in the mixture is from about 99:1 to about 20:80, and preferably, from about 99:1 to 50:50. The most preferred ratio is from about 99:1 to 75:25.

In a preferred embodiment, the nickel-copper catalyst is free of precious metals. However, in other embodiments, the catalyst may contain small amounts of precious metals selected from platinum, palladium or rhodium. Such precious metals may be included in amounts of up to 5 wt %.

In one embodiment, the nickel-copper catalyst further includes a catalyst promoter selected from the group consisting of zirconium oxide, cerium oxide, aluminum oxide, praseodymium oxide, lanthanum oxide, and barium oxide.

In another embodiment of the invention, an overcoat three-way catalyst is provided as a separate layer over the nickel-copper three-way catalyst, where the overcoat three-way catalyst is non-reactive with nickel and copper. The overcoat three-way catalyst may include a precious metal selected from the group consisting of platinum, palladium or rhodium.

In another embodiment of the invention, a vehicle exhaust gas treatment system is provided which comprises a three-way catalyst comprising a mixture of nickel and copper on a carrier substrate which is non-reactive with nickel and copper. The nickel-copper catalyst is positioned in the exhaust passage of a vehicle. In one embodiment, an overcoat three-way catalyst may be positioned over the nickel-copper catalyst, where the overcoat three-way catalyst is non-reactive with nickel and copper. A second, conventional three-way catalyst may also be positioned downstream from the nickel-copper catalyst.

In another embodiment, the treatment system may further include a close-coupled three-way catalyst positioned upstream from the nickel-copper catalyst.

In yet another embodiment of the invention, a method of providing a nickel-copper three-way catalyst on a carrier substrate is provided which comprises providing a carrier substrate which is non-reactive with nickel and copper, and impregnating the carrier substrate with a solution comprising a mixture of a nickel compound selected from nickel nitrate, nickel acetate, nickel carbonate, nickel sulfate, and combinations thereof; and a copper compound selected from copper nitrate, copper acetate, copper carbonate, copper sulfate, and combinations thereof. The carrier substrate is preferably selected from zirconium oxide, cordierite, silicon carbide, or silica gel.

In another embodiment of the invention, a method for treating engine exhaust gases is provided which comprises providing a three-way catalyst comprising nickel and copper on a carrier substrate which is non-reactive with nickel and copper; positioning the catalyst in the exhaust passage of an engine; and exposing the catalyst to engine exhaust gas emissions containing carbon monoxide (CO), hydrocarbons (HC) and $NO_x$ such that at least a portion of the emissions are converted to $CO_2$, $H_2O$ and $N_2$ at a temperature between about 250° C. to 1000° C.

In this embodiment, when the engine exhaust gas is subjected to a rich cycle, the three-way catalyst provides a CO and HC conversion efficiency of at least 50% at a temperature between about 250° C. to about 1000° C. The three-way catalyst also provides a supplemental oxygen storage capacity of about 2 mole O/ft$^3$ to about 50 mole O/ft$^3$. The catalyst further provides a water-gas shift activity of 50% to 100% equilibrium conversion at a temperature of 250° C. to 1000° C.

When the engine exhaust gas is subjected to a lean cycle, the catalyst provides a $NO_x$ conversion efficiency of at least 60% at a temperature between about 250° C. to about 1000° C. during the transition from rich to lean conditions. The $NO_x$ conversion is provided by reacting with the depleted oxygen storage capacity of the Ni—Cu catalyst, or by reacting with the hydrogen generated from the water-gas shift reaction. Preferably, the three-way catalyst provides a supplemental oxygen storage capacity during the transition from rich to lean conditions of about 2 mole O/ft$^3$ to about 50 mole O/ft$^3$ which can be depleted or replenished at rich or lean conditions.

Accordingly, it is a feature of embodiments of the invention to provide a three-way catalyst comprising a mixture of nickel and copper which is effective in reducing carbon monoxide, hydrocarbon emissions, and nitrogen oxides from a vehicle exhaust. Another feature of the nickel-copper catalyst is to provide enhanced oxygen storage capacity (OSC) and removal of carbon monoxide and hydrocarbons via catalyzation of a water-gas-shift (WGS) reaction or steam-reforming reaction.

Other features and advantages of the invention will be apparent from the following description, the accompanying drawings, and the appended claims.

DETAILED DESCRIPTION OF THE PREFERRED EMBODIMENTS

The use of a three-way catalyst comprising nickel and copper for reducing vehicle exhaust emissions provides an advantage over conventional three-way catalysts (TWC) as the nickel-copper catalyst provides a larger oxygen-storage-capacity (OSC) and exhibits higher CO and HC conversion efficiency during rich air/fuel excursions.

In addition, the nickel-copper catalyst, after the depletion of oxygen storage capacity, can further provide the reduction of carbon monoxide and/or hydrocarbons via catalytic water-gas-shift (WGS) and steam-reforming reactions. For example, during extended rich conditions when the OSC is depleted, the nickel-copper catalyst can catalyze the reaction of water with carbon monoxide (via WGS reaction) or the reaction of water with hydrocarbons (steam-reforming) to form carbon dioxide and hydrogen in the engine exhaust.

While the use of nickel-based catalysts has been shown to provide OSC and WGS functions to a conventional TWC-aftertreatment system, we have found that by incorporating an amount of copper with nickel, OSC and WGS functions are significantly enhanced over that of the nickel-based catalyst alone, resulting in increased reaction rate at lower operating temperatures. Thus, the use of a nickel-copper catalyst provides greater flexibility for use within an exhaust system and provides higher efficiencies in reducing the emissions of carbon monoxide, hydrocarbons, and nitrogen oxides.

In addition, by utilizing nickel and copper together on a carrier which contains no materials which are reactive to nickel or copper, there is no potential negative interaction between the nickel and copper with reactive materials such as alumina. This is an improvement over prior TWC washcoats containing alumina which have been impregnated with nickel. It is known that both nickel and copper will react with alumina to form nickel- and copper-aluminate. While not wishing to be bound by theory, it is believed that the deactivation of current commercial Ni-loaded three-way catalysts which occurs during aging is attributed to the formation of nickel-aluminate. Copper can also react with alumina under severe aging conditions.

Thus, by using a nickel-copper catalyst on a carrier which is free of reactive alumina or other reactive components, deactivation of the nickel or copper is minimized during vehicle aging.

The nickel-copper catalyst may be used as a replacement for conventional three-way catalysts or may be used in combination with such catalysts. In embodiments where an overcoat TWC is provided over the nickel-copper catalyst as a washcoat, the washcoat materials are also free of reactive components such as alumina such that negative interaction is avoided between the nickel-copper mixture and components in the overcoat TWC materials during vehicle aging which could compromise the TWC function.

The preferred ratio of nickel to copper in the catalyst is from 99:1 to 50:50, and most preferably, about 99:1 to 75:25. The ratio of Cu:Ni may be adjusted, depending on the desired vehicle application as well as the catalyst location within an exhaust aftertreatment system, which could impact its degradation environment.

In general, the higher the copper content in the catalyst, the higher the activity at low temperature but the lower the durability at high temperature. The ratio of copper to nickel is a function of the catalyst's operating environment as determined by its position in the exhaust system as well as the specific vehicle application. In general, as the distance between the Ni—Cu catalyst and the engine exhaust outlet increases, the ratio of copper to nickel may be increased.

Figure 1:
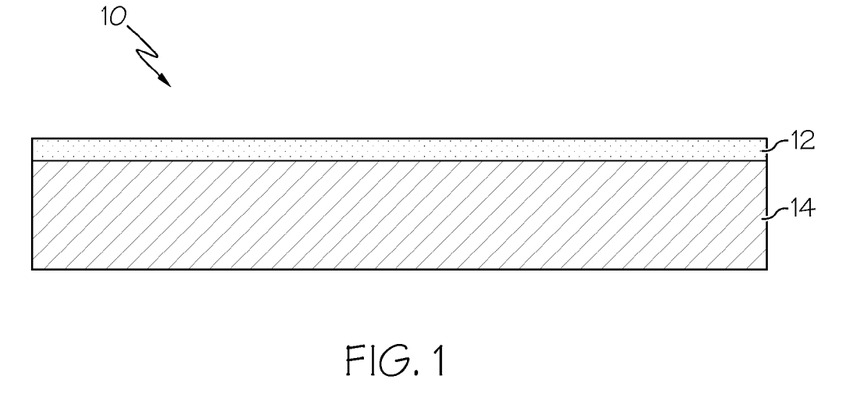
FIG. 1 is a schematic illustration of a catalyst including a mixture of nickel and copper impregnated on a carrier surface in accordance with an embodiment of the invention.
Figure 2:
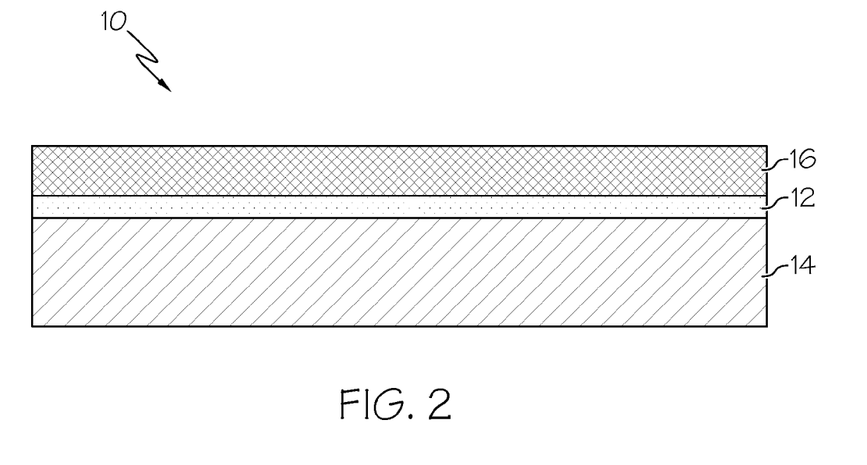
FIG. 2 is a schematic illustration of a nickel-copper catalyst on a carrier including an overcoat TWC washcoat layer in accordance with another embodiment of the invention.

Referring now to FIGS. 1 and 2, embodiments of the nickel-copper three-way catalyst 10 are shown. As shown in FIG. 1, the nickel-copper catalyst 12 is loaded on a carrier surface 14. While the nickel-copper catalyst is shown as a separate layer, it should be appreciated that the catalyst may also be present/impregnated throughout the pores in the carrier body.

Suitable carrier substrates for use include cordierite, zirconium oxide, silicon carbide, or silica gel. The nickel-copper catalyst is prepared by forming a solution containing a mixture of nickel and copper. The nickel and copper compounds are dissolved in water and mixed to achieve a homogeneous mixture. The nickel is preferably provided in an amount of about 0.05 to 0.30 g Ni/g-solution, and preferably about 0.105 g Ni/g-solution. Suitable nickel compounds for use include nickel nitrate, nickel acetate, nickel carbonate, nickel sulfate, or combinations thereof. Suitable copper compounds include copper nitrate, copper acetate, copper carbonate, copper sulfate, and combinations thereof. The copper is preferably provided in an amount of about 0.001 to 0.105 g Cu/g-solution, depending on the desired ratio of nickel to copper or the final loading of total Ni—Cu. It should be appreciated that the concentrations of Ni and Cu can be determined based on the final loading of Ni and Cu on the carrier and the amount of solution required for wetting the carrier.

The homogeneous nickel and copper solution is then impregnated directly into the carrier. One method is to use incipient wetness impregnation in which the catalyst solution is drawn into pores in the carrier substrate by capillary action. The carrier may be provided in the form of a honeycomb substrate. Alternatively, the nickel and copper solution may be impregnated on powders that are washcoated onto a honeycomb substrate.

The impregnated carrier is then dried and calcined prior to use. The impregnated carrier substrate is preferably dried at a temperature between about 100° C. and 250° C. for about 1 hour and then calcined at a temperature of between about 350° C. and 650° C. for 1 hour. The total amount of the nickel and copper mixture can be loaded in one step or by repeating the impregnation, drying, and calcining steps to build up to the desired levels of catalyst loading.

In order to enhance the properties of the nickel and copper, catalyst promoters may be added to the impregnated carrier. Suitable promoters include zirconium oxide, cerium oxide, aluminum oxide, praseodymium oxide, lanthanum oxide, and barium oxide. The promoters may be added to the impregnated carrier in solution by wet impregnation.

The nickel-copper catalyst is preferably free of precious metals, but in some embodiments may optionally include small amounts of up to 5 wt % precious metals such as platinum, palladium or rhodium to enhance performance of the catalyst. However, it should be appreciated that the enhancement depends on the operating conditions of the catalyst. At severe aging conditions at high temperatures, the enhancement resulting from the addition of precious metals has been found to diminish significantly.

The nickel-copper catalyst may also include an overcoat three-way catalyst (TWC) applied on the nickel-copper catalyst. The overcoat TWC catalyst may be provided as a conventional washcoat containing precious metals such as platinum, palladium, or rhodium, but should not contain any materials which would be reactive with nickel or copper. The overcoat TWC catalyst is preferably applied at a loading of about 1 to 5 g/in$^3$. The overcoat TWC washcoat may further include a catalyst promoter as described above.

Referring now to FIG. 2, a catalyst 10 is shown which includes the nickel-copper catalyst 12 impregnated in a carrier surface 14, and an overcoat three-way catalyst (TWC) layer 16 over the nickel-copper catalyst 12.

Figure 3:
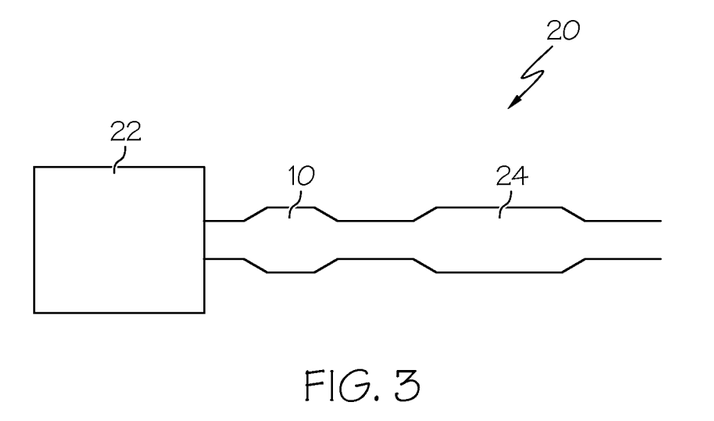
FIG. 3 is a schematic illustration of a nickel-copper catalyst positioned in an exhaust treatment system in accordance with an embodiment of the invention.
Figure 4:
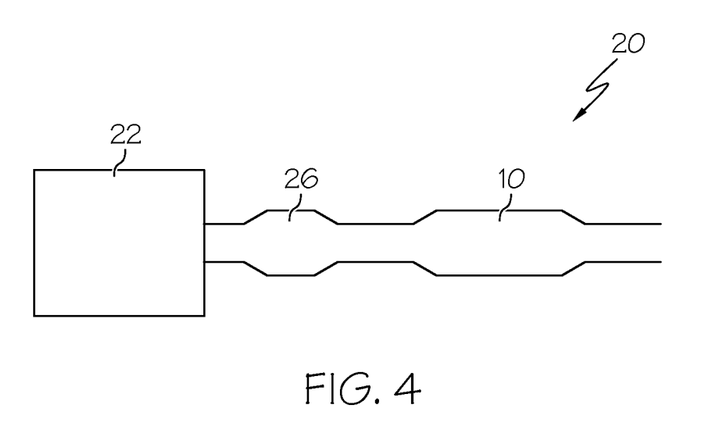
FIG. 4 is a schematic illustration of a nickel-based catalyst positioned in an exhaust treatment system in accordance with another embodiment of the invention.

Referring now to FIGS. 3-4, embodiments of an exhaust gas treatment system 20 including the nickel-copper catalyst are illustrated. It should be appreciated that the nickel-copper catalyst may be used in the exhaust gas treatment system of a gasoline or diesel engine. It should also be appreciated that the specific location of the nickel-copper catalyst in the exhaust gas system may vary according to the target catalyst temperature during vehicle operation. As shown in FIG. 3, the exhaust treatment system 20 is coupled to an exhaust manifold 22 of an engine and includes the nickel-copper catalyst 10 positioned in the exhaust gas stream. In the embodiment shown, a second TWC catalyst 24 is positioned downstream from the nickel-copper catalyst. The second TWC catalyst may be an under-body TWC, a selective-catalytic-reduction (SCR) catalyst, or a hydrocarbon trap that may be positioned downstream from the Ni—Cu catalyst.

Additionally, an overcoat of a conventional TWC catalyst may be provided on the nickel-copper catalyst as shown in FIG. 2.

As shown in FIG. 4, the exhaust gas treatment system 20 includes nickel-copper catalyst 10 positioned downstream from a close-coupled catalyst 26. By "close-coupled catalyst", it is meant a catalyst which is mounted immediately after the exhaust manifold. The close-coupled catalyst may contain a conventional washcoat composition such as active metals, alumina, zeolites, and cerium-containing OSC materials, and is configured for the removal of carbon monoxide, hydrocarbons, or nitrogen oxides at low light-off temperatures during the cold-start of a vehicle. The closed-coupled catalyst may contain a loading of precious metals.

Figure 5A:
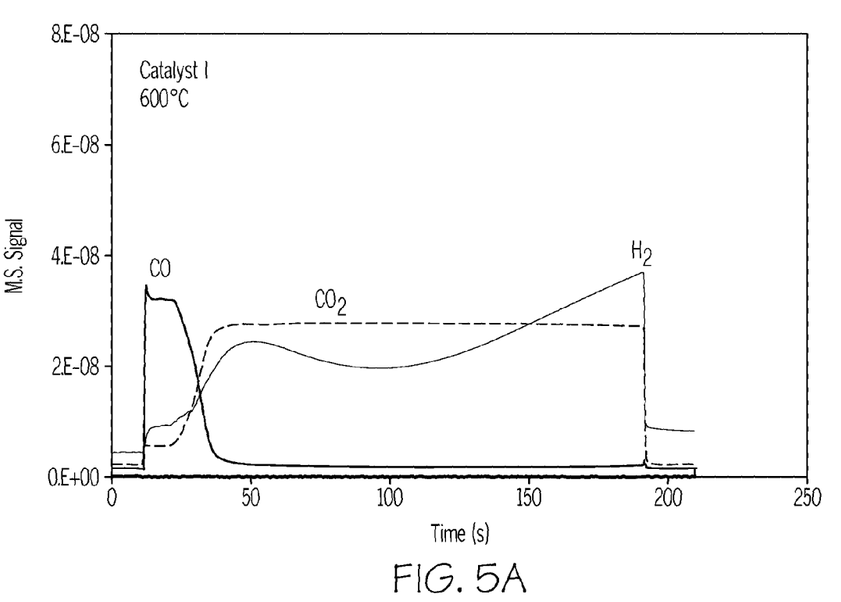
FIGS. 5A and 5B are graphs illustrating the reduction of CO from an engine exhaust using a nickel-copper catalyst in accordance with an embodiment of the invention.

When placed downstream from the close-coupled catalyst as shown, the nickel-copper catalyst functions to perform oxidation and reduction as well as water-gas shift and steam reforming as demonstrated in FIG. 5A. In this application, the Ni—Cu catalyst increases oxygen-storage capacity or activities for removing HC, CO, and $NO_x$. The Ni—Cu catalyst can also replace part of a TWC system to decrease the cost of the exhaust system.

During operation, as exhaust gas generated by the vehicle engine passes through the exhaust gas manifold 22, it passes through the nickel-copper catalyst 10 such that conversion of unburned HC and CO occurs. The conversion of NO also occurs, especially when the vehicle operation is undergoing a rich-to-lean transition. The conversions are also aided by the close-coupled catalyst 26 having conventional TWC functions. The nickel-copper catalyst enhances the efficiencies of these conversions by providing a larger OSC capacity than a conventional TWC catalyst and providing catalytic activity for further removal of carbon monoxide or hydrocarbons via WGS and steam-reforming reactions, especially under oxygen-deficient conditions for an engine exhaust.

These reactions are shown below:

$2CO + O_2 \rightarrow 2CO_2$      $O_2$ from engine exhaust or OSC $4HC + 3O_2 \rightarrow 2CO_2 + 2H_2O$      $O_2$ from engine exhaust or OSC $2NO + 2Ni \rightarrow N_2 + 2\,NiO$      NO being reduced to oxidize Ni $2HC + 2H_2O \rightarrow 2CO + 3H_2$      Steam-reforming reaction $CO + H_2O \rightarrow CO_2 + H_2$      WGS reaction In order that the invention may be more readily understood, reference is made to the following examples which are intended to illustrate embodiments of the invention, but not limit the scope thereof.

EXAMPLE 1

A three-way catalyst was prepared by dissolving a Ni compound and a Cu compound into distilled water with vigorous agitation to ensure homogeneous mixing of Ni and Cu. The catalyst (Catalyst III) was prepared with a Ni/Cu weight ratio of 94:6, and contained a homogeneous mixture of $9.517 \times 10^{-2}$ g Ni and $5.936 \times 10^{-3}$ g Cu per gram of solution (formed from nickel nitrate and copper nitrate). The solution was applied to a cordierite honeycomb at 2.14 g-solution per $in^3$-honeycomb. The wetted cordierite sample was dried at 150° C. for about 1 hour and then calcined at 600° C. for about 1 hour. The process of the wetting, drying, and calcining was repeated twice. The resulting Catalyst III contained 11 wt % of (Ni+Cu) with a Ni/Cu ratio of 94:6.

The same process was utilized to prepare other Cu-promoted Ni catalysts with various Ni/Cu ratios using solutions of different Ni and Cu concentrations. As shown in Table 1, some Cu-promoted Ni catalysts had Ni/Cu weight ratios ranging from 99:1 to 50:50. The table also includes data for a catalyst containing Ni only or Cu only for reference. All catalysts had Ni and Cu loaded directly onto cordierite honeycombs.

TABLE 1

Cu-promoted Ni catalysts with Ni and Cu loaded on cordierite honeycomb

| | Catalyst | | | | | |
|---|---|---|---|---|---|---|
| | I | II | III | IV | V | VI |
| Loading (wt %) | 12.6 | 12.3 | 11.0 | 10.6 | 11.1 | 11.5 |
| Ni/Cu ratio | 100:0 | 99:1 | 94:6 | 86:14 | 50:50 | 0:100 |

EXAMPLE 2

Promotion of CO-Removal by Cu for Ni-Based Catalysts

Figure 5B:
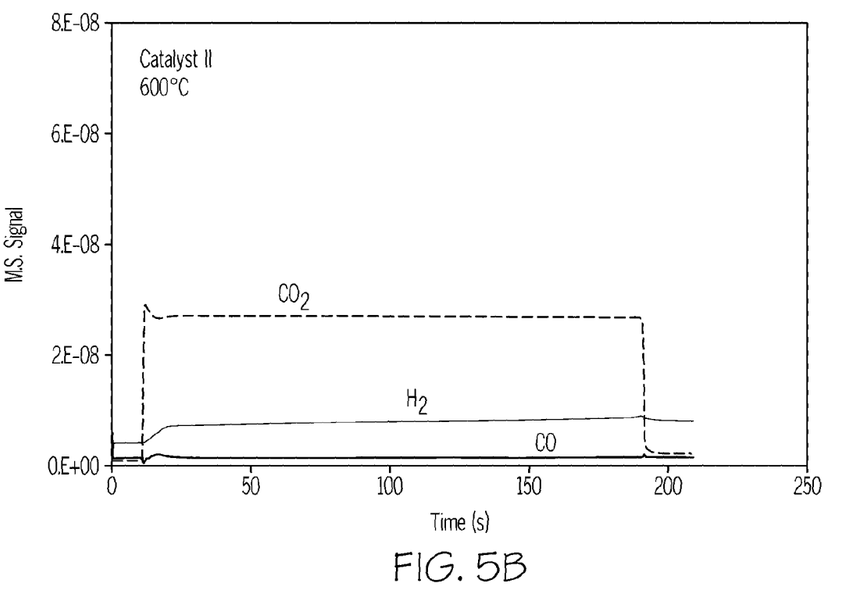

A three-way catalyst containing copper and nickel from Example 1 was tested for CO removal and was compared with catalysts which contained only nickel. To evaluate the efficiencies for comparison, a catalyst of 1"L×¾"D size was placed inside a quartz reactor of a flow reactor system with a total flow of 3 l/min containing 10% $H_2O$. The catalyst sample was oxidized in 0.5% $O_2$ at 600° C. prior to evaluation. At the measurement temperature, a pulse of 1% CO was added into the gas mixture through the catalyst. The conversion of CO in 10% $H_2O$ to $CO_2$ and/or $H_2$ was determined. The results of CO-pulse at 600° C. over Catalyst I (as shown in FIG. 5A) slowed 100% CO conversion. The result over Catalyst II (FIG. 5B) also showed 100% CO conversion but with a shorter initiation period. As can be seen, the addition of a small amount of Cu to the Ni-based catalyst (Catalyst II with Ni/Cu ratio of 99:1) resulted in an improvement in CO removal.

Figure 6A:
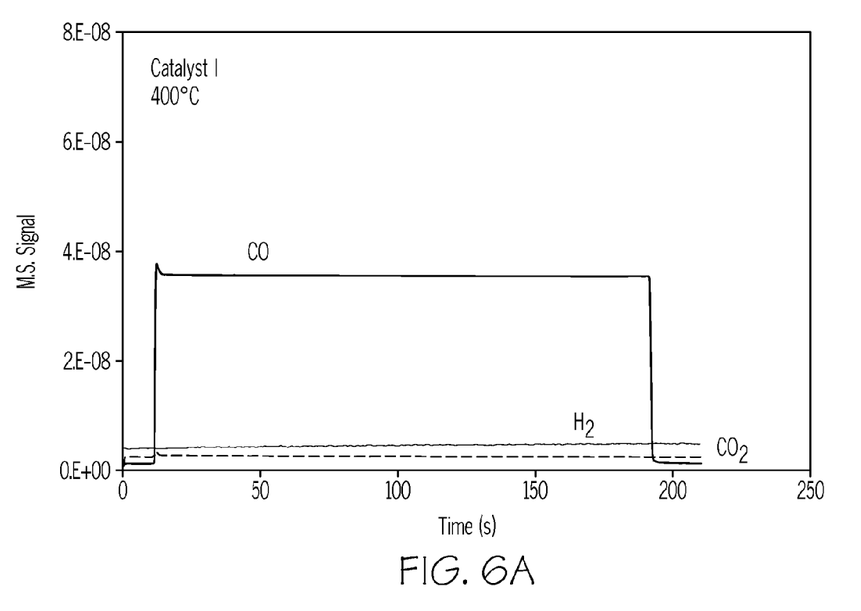
FIGS. 6A, 6B, and 6C are graphs illustrating the reduction of CO in an engine exhaust using a nickel-copper catalyst in accordance with another embodiment of the invention.
Figure 6B:
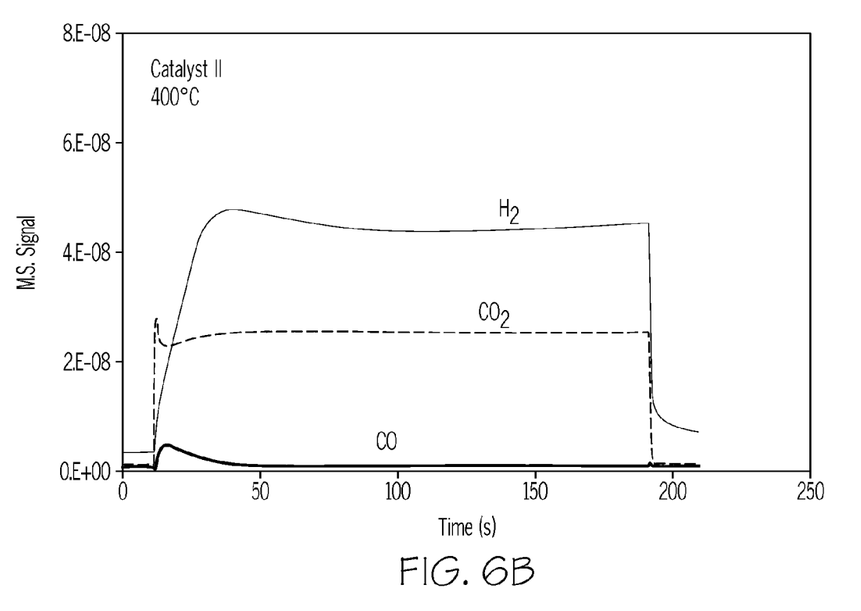
Figure 6C:
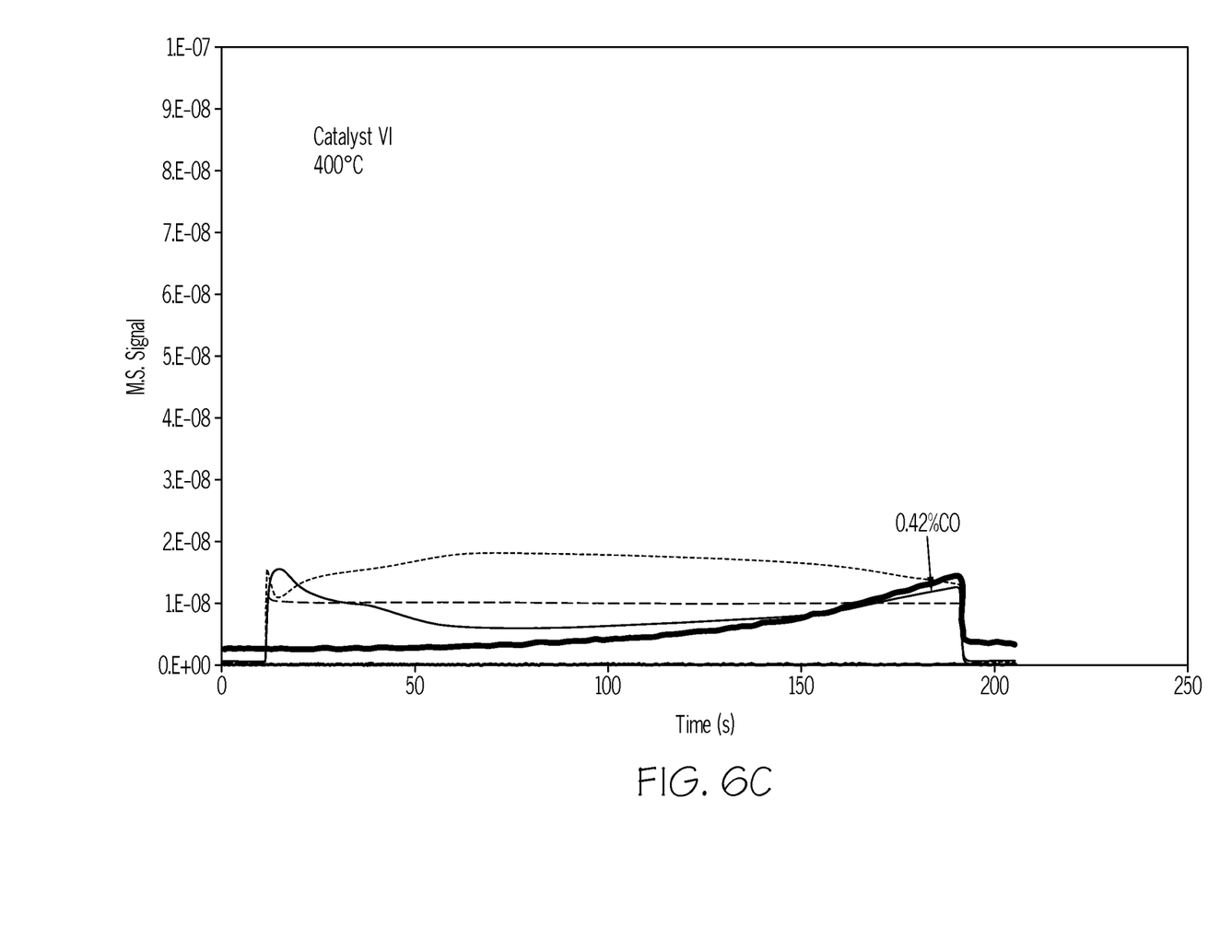

Under the same testing conditions, Catalyst I containing only Ni without Cu showed no significant efficiency for CO removal at 400° C. (FIG. 6A), while Catalyst III with the Ni/Cu weight ratio of 94:6 showed 100% CO removal at 400° C. (FIG. 6B). Addition of 6% Cu into the Ni-based catalyst lowered the temperature for CO removal, enhancing the efficiency of decreasing CO emissions in the vehicle exhausts. FIG. 6C shows nearly 100% CO-removal at 400° C. with significant levels of $H_2$ generated from a WGS reaction, indicating that the added Cu can promote the activity for WGS reaction in addition to improving OSC properties. In FIG. 6C, Catalyst VI containing only Cu shows 42% of CO unconverted at 400° C. after being exposed to 1% CO for 3 minutes, indicating a lower WGS activity for Cu alone than that for Catalyst III. As can be seen, the addition of Cu to Ni on WGS reaction activity at low temperatures provides the benefit of CO removal in vehicle exhausts during an extended period of operation under rich conditions when the OSC is depleted.

Table 2 lists the efficiency of CO removal for the catalysts containing Ni and/or Cu showing the promotion of CO removal at or below 500° C. by the addition of Cu. The amount of $H_2$ generated for the catalyst containing Cu and Ni was larger than that for either the Ni-only or Cu-only catalyst. The generation of $H_2$ is the result of WGS reaction in which CO reacts with $H_2O$ to $CO_2$ and $H_2$. The combination of Cu and Ni promotes the activity for WGS reaction, resulting in improved removal of CO at a lower temperature.

TABLE 2

Effect of Cu on the removal of CO and generation of $H_2$ during the exposure to 1% CO for 3 minutes (total 30 ml CO used) for Ni-based catalysts

| | T = 500° C. | | T = 400° C. | | T = 350° C. | |
|---|---|---|---|---|---|---|
| Catalyst | % CO removed | $H_2$, ml yield | % CO removed | $H_2$, ml yield | % CO removed | $H_2$, ml yield |
| I | 13 | 6.2 | 3.2 | 0.0 | 0.0 | 0.0 |
| II | 100 | 14 | 97 | 65 | 34 | 27 |
| III | 100 | 19 | 99 | 67 | 66 | 60 |
| IV | 100 | 21 | 97 | 52 | 76 | 50 |
| V | 100 | 10 | 97 | 28 | 69 | 13 |
| VI | 86 | 4.6 | 73 | 4.3 | 59 | 7.0 |

EXAMPLE 3

CO or NO Removal in Simulated Vehicle Exhausts Over (Ni—Cu) Catalysts

Figure 7:
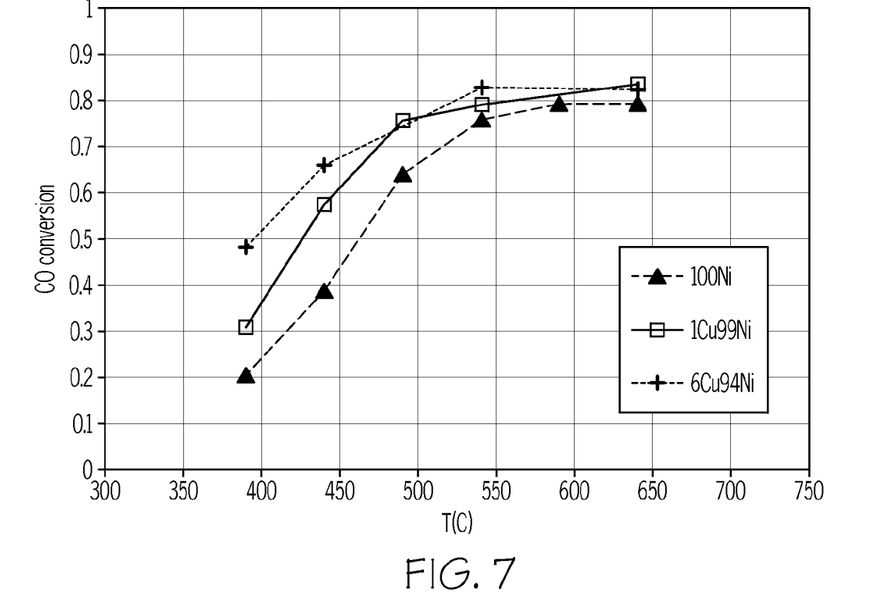
FIG. 7 is a graph illustrating the CO conversion efficiency of different nickel-copper catalysts as a function of temperature in an engine exhaust.
Figure 8:
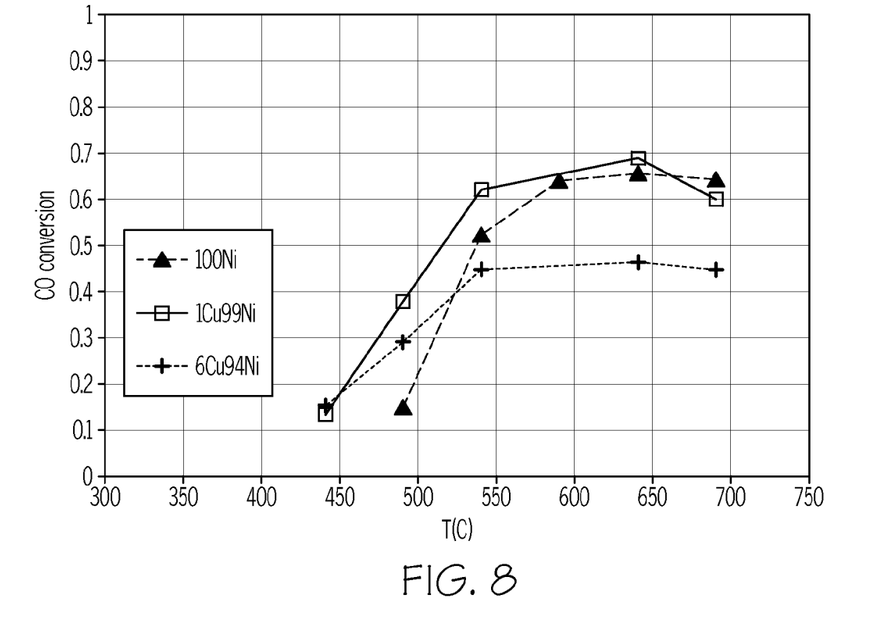
FIG. 8 is a graph illustrating the CO conversion efficiency of different nickel-copper catalysts as a function of temperature after aging.
Figure 9:
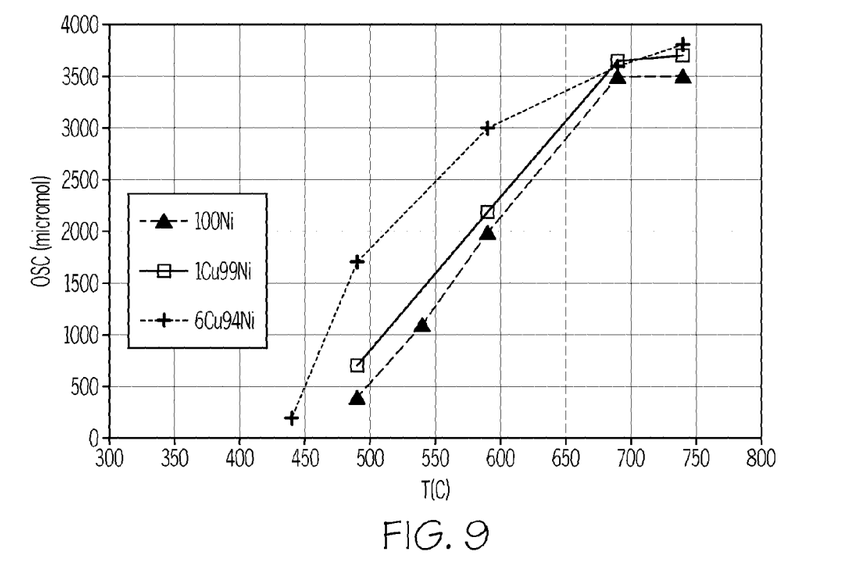
FIG. 9 is a graph illustrating the oxygen storage capacity (OSC) of different nickel-copper catalysts as a function of temperature.
Figure 10:
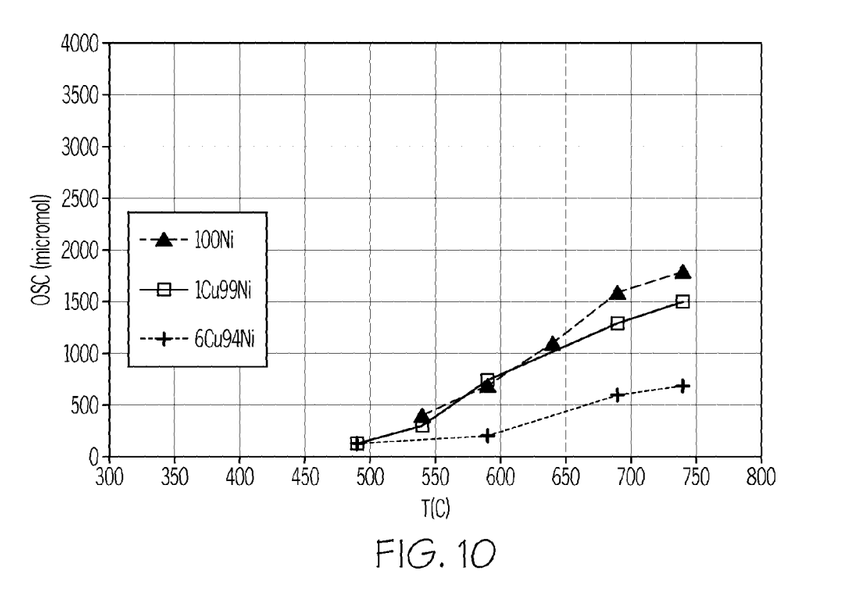
FIG. 10 is a graph illustrating the oxygen storage capacity (OSC) of different nickel-copper catalysts as a function of temperature after aging.

The examples from Table 2 were further evaluated for the rate of removing pollutants in vehicle exhausts on a pulse-flame combustor (pulsator). Catalysts of 0.40 in$^3$ size were evaluated for CO conversion efficiency and oxygen storage capacity (OSC) under fresh conditions and following simulated vehicle aging on a pulsator which combusts fuel to generate a simulated vehicle exhaust. The aging cycle in this example was designed to mimic the harshest in-use vehicle environment for this technology (close-coupled to the engine). Pulsator aging was performed by placing the samples into the pulsator-generated exhaust gas stream behind a close-coupled conventional three-way catalyst. The pulsator exhaust was continuously cycled between lean and rich air-fuel conditions at an exponentially weighted temperature of 910° C. in order to accelerate the aging process. The accelerated aging time to simulate 120,000 vehicle miles was 100 hours. A pulsator was used to test the CO conversion efficiency of the samples before and after aging, as shown in FIGS. 7 and 8, respectively. A fuel-rich exhaust environment was used to generate 7-second pulses of 5% excess CO in the exhaust gas stream, flowing at 10 liter per minute (LPM) resulting in a space velocity of 100,000 hr$^{-1}$. The conversion efficiency of CO over the oxidized catalyst samples was measured as a function of inlet gas temperatures. The oxidation of the catalyst was performed at the same temperature as the CO conversion efficiency test temperature in 4% excess oxygen. The oxygen storage capacity (OSC) of the catalyst was measured before and after pulsator aging as shown in FIGS. 9 and 10, respectively. The OSC of the catalyst was determined by reducing the catalyst for 6 minutes followed immediately by a 6 minute pulse of 4% excess oxygen. OSC was calculated during the lean portion of the test at the temperatures indicated.

CO was converted across the Ni-containing catalysts via water-gas shift and oxidation reactions with metal-oxide. FIG. 7 shows that increasing the portion of Cu in the Ni catalysts improves CO conversion in the lower temperature portion of the tests (400° C.-500° C.). Following 120,000 mile vehicle simdated aging, the lower temperature CO conversion of the 99:1 Ni—Cu catalyst remains better than pure Ni (about 40% compared to about 10% at 500° C.), yet the 94:6 Ni—Cu catalyst COconversion efficiency was worse than either sample (FIG. 8) at temperatures exceeding 550° C. FIG. 9 shows that adding low levels of Cu to the Ni catalyst increases its OSC, specifically during lower operating temperatures. FIG. 10 shows that the 99:1 Ni—Cu sample retained higher OSC than the 94:6 Ni—Cu sample following the simulated close-coupled catalyst vehicle aging environment.

The impact of aging severity on catalyst degradation was also determined for various Ni:Cu ratio catalysts. Ni—Cu catalysts having three different ratios were prepared as described above (Catalyst II=99:1 Ni—Cu, Catalyst III=94:6 Ni—Cu, and Catalyst V=50:50 Ni—Cu). The catalysts were aged in a retort oven at 890° C. for 100 hours, evaluated, then aged for an additional 15 hours at 960° C. and re-evaluated. The samples were exposed to pulsator-generated exhaust gas during aging. The pulsator 7-second CO pulse test described above was used to determine CO conversion efficiency via WGS+OSC of the various catalysts. The WGS activity of the catalyst was determined after the sample was reduced for five minutes in a stream of combustion exhaust containing 5% excess CO. Table 3 below shows that 6:94 Cu—Ni exhibits the best CO conversion via WGS+OSC as well as the best WGS performance following a milder oven aging at 890° C. for 100 hours. Aging these samples for an additional 15 hours at 960° C. reversed the order of performance of 94:6 Ni—Cu and 99:1 Ni—Cu, i.e., the lowest Ni—Cu ratio of 99:1 showed the best CO conversion activity (Table 4).

TABLE 3

Effect of Ni:Cu ratio on CO conversion via OSC + WGS and WGS as a function of evaluation temperature following retort aging at 890° C. for 100 hours.

| retort oven 890° C./100 hrs | 450° C. % CO conversion | 450° C. % CO via WGS | 500° C. % CO conversion | 500° C. % CO via WGS | 650° C. % CO conversion | 650° C. % CO via WGS |
|---|---|---|---|---|---|---|
| 99:1 Ni—Cu | 42 | 15 | 52 | 49 | 71 | 50 |
| 94:6 Ni—Cu | 44 | 23 | 66 | 60 | 74 | 50 |
| 50:50 Ni—Cu | 15 | 7 | 35 | 24 | 60 | 31 |

TABLE 4

Effect of Ni:Cu ratio on CO conversion via OSC + WGS and WGS as a function of evaluation temperature following retort aging at 890° C. for 100 hours + 960° C. for 15 hours

| retort oven 890 C./100 hrs + 960 C./15 hrs | 450° C. % CO conversion | 450° C. % CO via WGS | 500° C. % CO conversion | 500° C. % CO via WGS | 650° C. % CO conversion | 650° C. % CO via WGS |
|---|---|---|---|---|---|---|
| 99:1 Ni—Cu | 41 | 15 | 51 | 42 | 66 | 50 |
| 94:6 Ni—Cu | 32 | 18 | 45 | 32 | 59 | 43 |
| 50:50 Ni—Cu | 15 | 10 | 20 | 8 | 31 | 9 |

As can be seen, adding low levels of Cu to the Ni catalyst increases its fresh CO conversion activity and OSC at lower operating temperatures. However, the amount of Cu that should be added to the Ni catalyst is limited by the impact of thermal degradation during vehicle simulated aging. The reduction/oxidation function of the catalyst having a higher Cu:Ni ratio degrades to a greater extent during the relatively harsh vehicle-simulated aging environment demonstrated here.

Figure 11:
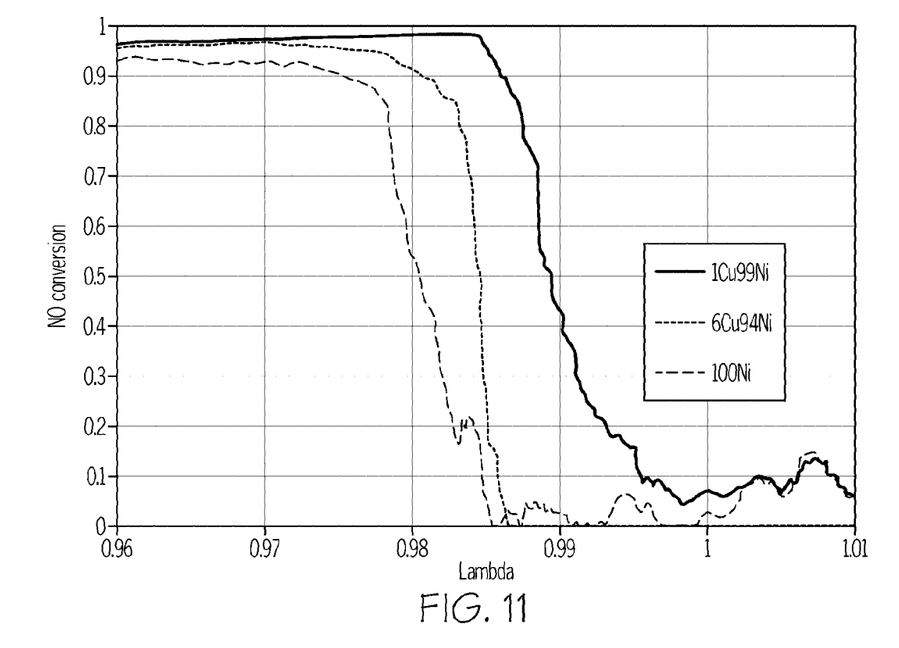
FIG. 11 is a graph illustrating the NO conversion efficiency of different nickel-copper catalysts in accordance with an embodiment of the invention.
Figure 12:
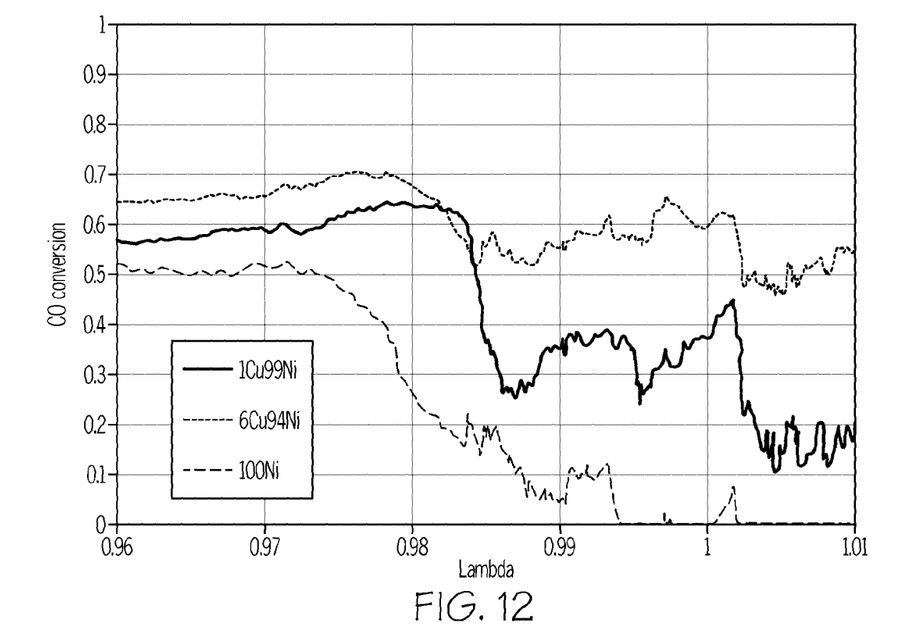
FIG. 12 is a graph illustrating the NO conversion efficiency of different nickel-copper catalysts in accordance with an embodiment of the invention.

The CO and NO (nitric oxide) conversion efficiency of 3 pulsator-aged samples with varying Ni:Cu ratios (100 Ni (Catalyst I), 99:1 Ni—Cu (Catalyst II), and 94:6 Ni—Cu (Catalyst III)) as a function of lambda (actual air-fuel ratio/stoichiometric air-fuel ratio) were tested on a pulsator. The testing was conducted at a space velocity of 35000 $hr^{-1}$ and an exhaust feedgas temperature of 630° C. All the samples were evaluated behind a Pd-only catalyst that did not contain an oxygen storage (OSC) material. Each sample was oxidized in air at 700° C. for 20 minutes prior to the lambda sweep test. FIG. 11 shows that the 99:1 Ni—Cu sample converted NO closer to stoichiometry (lambda=1) than the other samples, demonstrating the beneficial impact of the addition of low amounts of Cu on the rate of reduction of Ni—Cu following aging. FIG. 12 shows that CO conversion increases with increasing Cu fraction during this relatively low SV lambda sweep test.

It can be concluded that a low ratio of Cu:Ni is desired for maintaining oxygen storage capacity after aging as well as greater air-fuel operating range for NO conversion. Higher ratios of Cu:Ni may be desired for increasing CO conversion, including via oxidation using bulk gas oxygen (lean portion of lambda sweep).

EXAMPLE 4

Evaluation of the Nickel-Copper Catalyst on a Vehicle

A cylindrical honeycomb substrate of cordierite sized at 2.15 inches (5.5 cm) in length and 4.66 inches (11.8 cm) in diameter was soaked in a 35 ml solution of Ni and Cu at one end. The other end of the substrate was then soaked in a 32 ml solution of Ni and Cu. The solution consisted of 0.109 g Ni and $1.10 \times 10^{-3}$ g Cu per gram solution. After both ends were soaked in the solution, the wetted substrate was dried at 150° C. for 0.5 hour and calcined at 600° C. for 1 hour. The process of soaking, drying, and calcination was repeated two more times. The resulting catalyst brick (Catalyst VII) contained 11.6 wt % nickel and copper with a weight ratio of Cu:Ni of 1:99.

A portion of a production TWC system was replaced with a less expensive transition metal catalyst (Catalyst VII) and tested on a 2 L GTDI (gasoline turbo-charged direct injection) vehicle. The emissions from the nickel-based catalyst system and a baseline production TWC system were measured on the vehicle during the FTP and US06 drive cycles, run on chassis-roles dynamometer. The FTP (Federal test procedure) drive cycle is used to determine whether a catalyst system can meet regulated emissions standards on a specific vehicle. The US06 drive cycle is a test cycle that is used to represent highway driving where the vehicle operates at higher speed and load conditions than what may be typical of less aggressive drive cycles. The production aftertreatment system (baseline) for this 2 L GTDI vehicle consisted of two close-coupled three way catalysts: TWC(1)+TWC(2).

Figure 13:
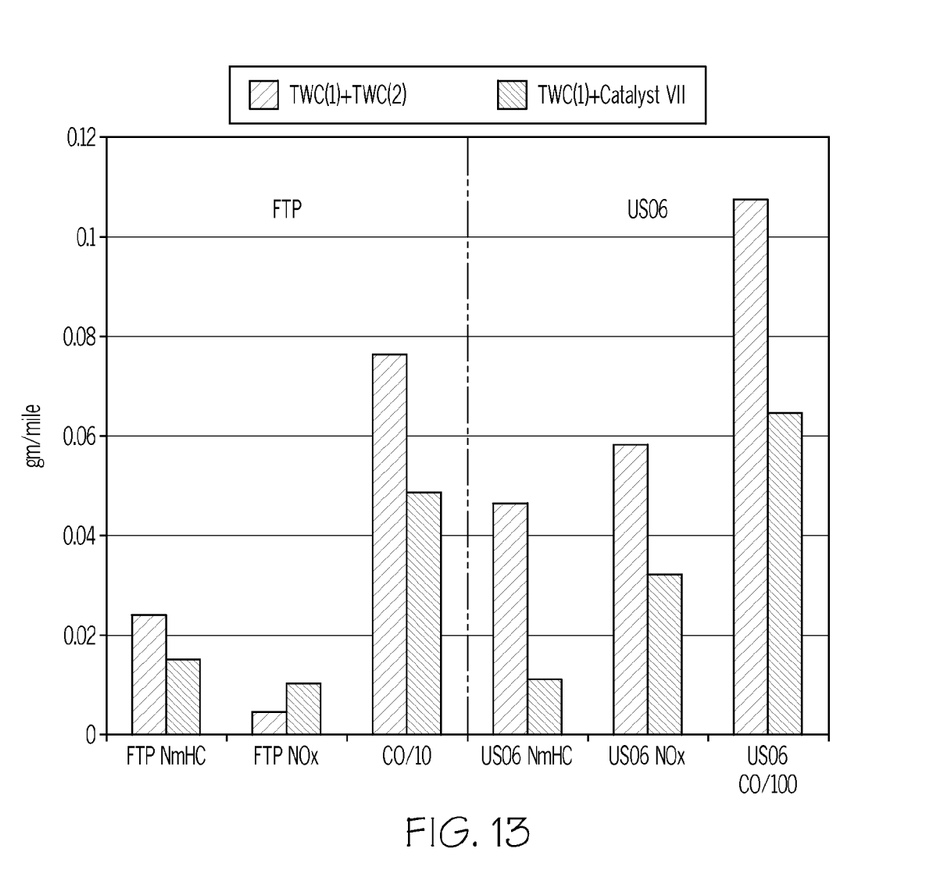
FIG. 13 is a graph comparing exhaust emissions from a gasoline engine using a conventional close-coupled TWC catalyst versus a nickel-copper catalyst in accordance with an embodiment of the invention.

The second close-coupled catalyst, TWC(2), was replaced with Catalyst VII in the comparative catalyst system. Both catalyst systems were aged in a retort oven at 910° C. for 100 hours prior to testing on the vehicle. The total grams/mile emissions during the test cycles are summarized in FIG. 13. The sum of FTP nmHC+NOx for the system including Catalyst VII is equal to the baseline TWC system. The FTP and US06 CO emissions decreased by 40% when replacing the second close-coupled TWC with Catalyst VII. US06 nmHC decreased by 75% and US06 NOx decreased by 45% when replacing TWC(2) with catalyst VII in the catalyst system.

Having described the invention in detail and by reference to preferred embodiments thereof, it will be apparent that modifications and variations are possible without departing from the scope of the invention.

What is claimed is:

1. A three-way catalyst for use in a vehicle exhaust comprising:
a catalyst comprising a mixture of nickel and copper on a carrier, wherein said carrier is non-reactive to nickel and copper, wherein said nickel is contained on said carrier at a loading of between about 4 to about 20 wt % and wherein said copper is contained on said carrier at a loading of between about 0.04 to about 10 wt %; wherein said catalyst is free of precious metals.

2. The catalyst of claim 1 wherein said carrier comprises a material selected from the group consisting of zirconium oxide, cordierite, silicon carbide, silica gel, or non-reactive alumina.

3. The catalyst of claim 1 wherein said carrier is in the form of a honeycomb substrate.

4. The catalyst of claim 1 wherein said carrier is in powder form.

5. The catalyst of claim 1 wherein said mixture of nickel and copper is contained on said carrier at a loading of between about 2 to 20 wt %.

6. The catalyst of claim 1 wherein said mixture of nickel and copper is contained on said carrier at a loading of between about 8 to 15 wt %.

7. The catalyst of claim 1 wherein a weight ratio of nickel to copper is from about 99:1 to 20:80.

8. The catalyst of claim 1 wherein a weight ratio of nickel to copper is from about 99:1 to 50:50.

9. The catalyst of claim 1 including a catalyst promoter selected from zirconium oxide, cerium oxide, aluminum oxide, praseodymium oxide, lanthanum oxide, and barium oxide.

10. The catalyst of claim 1 including an overcoat three-way catalyst provided as a separate layer over the nickel-copper three-way catalyst, wherein said overcoat three-way catalyst is non-reactive with nickel and copper.

11. The catalyst of claim 10 wherein said overcoat three-way catalyst includes a precious metal selected from the group consisting of platinum, palladium, or rhodium.

12. A vehicle exhaust gas treatment system comprising:
a three-way catalyst comprising a mixture of nickel and copper on a carrier substrate which is non-reactive with nickel and copper, said catalyst positioned in an exhaust passage of a vehicle, wherein a weight ratio of nickel to copper is from about 99:1 to 20:80 and wherein said nickel is contained on said carrier at a loading of between about 4 to about 20 wt % and wherein said copper is contained on said carrier at a loading of between about 0.04 to about 10 wt %; and wherein said catalyst is free of precious metals.

13. The treatment system of claim 12 further including an overcoat three-way catalyst over said nickel-copper catalyst, wherein said overcoat three-way catalyst is non-reactive with nickel and copper.

14. The treatment system of claim 12 further including a close-coupled three-way catalyst positioned upstream from said nickel-copper catalyst.

15. The treatment system of claim 12 further including a second three-way catalyst positioned downstream from said nickel-copper catalyst.

16. The treatment system of claim 15 wherein said second three-way catalyst may be an under-body three-way catalyst, a selective-catalytic-reduction (SCR) catalyst, or a hydrocarbon trap.

17. The treatment system of claim 14 wherein the close-coupled three-way catalyst may contain a conventional washcoat composition such as active metals, alumina, zeolites, and cerium-containing OSC materials.

* * * * *